United States Patent
Ohishi et al.

(10) Patent No.: US 6,505,942 B2
(45) Date of Patent: Jan. 14, 2003

(54) ANTI-REFLECTION MATERIAL, POLARIZATION FILM, AND PRODUCTION METHODS THEREFOR

(75) Inventors: Kazuya Ohishi, Shizuoka (JP); Chikara Murata, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/827,351

(22) Filed: Apr. 6, 2001

(65) Prior Publication Data

US 2002/0034008 A1 Mar. 21, 2002

(30) Foreign Application Priority Data

Apr. 7, 2000 (JP) .......................................... 2000-106047

(51) Int. Cl.⁷ ............................................... G02B 27/00
(52) U.S. Cl. ........................ 359/601; 359/602; 359/603; 359/604; 359/608
(58) Field of Search ................................... 359/601, 602, 359/603, 604, 608, 613, 493, 495, 584, 586, 883, 884

(56) References Cited

U.S. PATENT DOCUMENTS

| | | | | |
|---|---|---|---|---|
| 4,855,180 A | * | 8/1989 | Kawamura | .................. 351/163 |
| 5,673,150 A | * | 9/1997 | Ono et al. | .................. 359/265 |
| 5,952,084 A | * | 9/1999 | Anderson et al. | ........... 359/359 |

* cited by examiner

*Primary Examiner*—Mohammad Sikder
(74) *Attorney, Agent, or Firm*—Arent Fox Kintner Plotkin & Kahn, PLLC

(57) ABSTRACT

The present invention provides an anti-reflection material, and a polarization film employing the anti-reflection material, having superior anti-glare properties, anti-reflection properties, and anti-static properties. In the anti-reflection material, an anti-glare layer is provided on the surface of a transparent substrate directly or via another layer, a low reflection layer having lower reflective index than that of the anti-glare layer is provided on the surface of the anti-glare layer, and the frontmost surface of the anti-reflection material is subjected to a surface hydrophilizing treatment.

12 Claims, 1 Drawing Sheet

ANTI-REFLECTION MATERIAL, POLARIZATION FILM, AND PRODUCTION METHODS THEREFOR

BACKGROUND OF THE INVENTION

The present invention relates to an anti-reflection material and to a polarization film employing the anti-reflection material, which is suitable for use in displays such as liquid crystal displays (LCDs), plasma displays (PDPs), CRTs, ELs, etc., and in particular, relates to an anti-reflection material and to a polarization film employing the anti-reflection material, having superior anti-glare properties, anti-reflection properties, and anti-static properties.

Displays typified by LCDs, PDPs, CRTs, and ELs are widely used in various fields such as television and computer technologies, and have been developed rapidly. In particular, LCDs are in remarkably common use in lap-top-type personal computers and word processors, portable telephones, PHSs, various portable terminals, etc., as displays which are thin, light, and extremely versatile.

Figure 3:
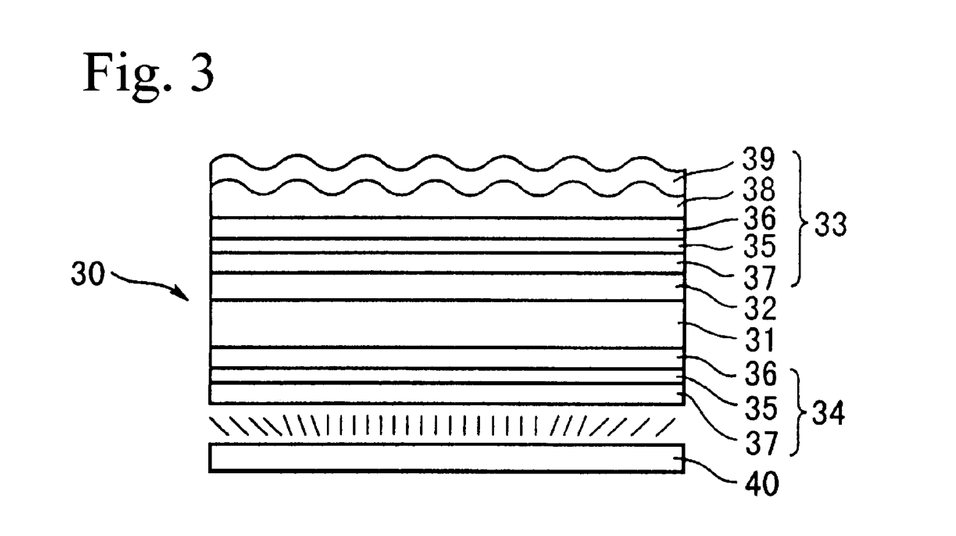
FIG. 3 is a schematic cross-sectional drawing showing a structure of a liquid display equipped with a polarization film employing an anti-reflection material.

Generally, as shown in FIG. 3, LCDs have a construction in which a back light 40 is arranged at the rear (the lower side in FIG. 3) of a liquid-crystal display panel 30 which is a multilayer lamination. In the liquid-crystal display panel 30, a liquid crystal cell 32 and a polarization film 33 having a low reflection layer are laminated on the front (the upper side in FIG. 3) of a TFT glass substrate 31, in that order, and a polarization film 34 without a low reflection layer is laminated on the rear of the TFT glass substrate 31. The polarization films 33 and 34 have a basic construction in which a transparent substrate 36 consisting of TAC (triacetylcellulose), etc., and a protective material 37 are laminated on the front and the rear of a polarization material 35 consisting of a PVA (polyvinyl alcohol) film, etc., respectively. In the polarization film 33 having a low reflection layer, an anti-glare layer 38 and a low reflection layer 39 are laminated in that order. In the anti-glare layer 38, for example, a UV-curable resin coating material in which an acrylic compound is contained as a primary material can be employed, and in the low reflection layer 39, for example, a fluorine-containing resin coating material can be employed.

Furthermore, in such display, there was a problem in that contaminants such as dust, etc., adhered due to static electricity occurring at the surface thereof. As a method for preventing the static electricity on the surface of this display, specifically, in a display having the above construction, ① a method in which an electroconductive material having an anti-static effect is used as a material for forming the anti-glare layer; ② a method in which electroconductive fillers are contained in the anti-glare layer; and ③ a method in which an electroconductive material is used as a material for forming the low reflection layer, can be mentioned.

However, in the above method ①, problems in physical properties such as decreasing of surface hardness, lack of adhesion to saponified TAC which is a transparent substrate, etc., are caused, although the anti-static property is improved. In the above method ②, problems in optical properties such as increasing of turbidity in the anti-glare layer, decreasing of permeability thereon, etc., are caused. In addition, also in the above method ③, there is a problem in practice, since although the anti-static property is improved, disappearance of the low reflection property and decreasing of the surface hardness are caused.

SUMMARY OF INVENTION

Therefore, the present invention has been made in view of the above circumstances, and it is an object thereof to provide an anti-reflection material which can not only exhibit superior anti-glare properties, anti-reflection properties, and durability, but can also exhibit anti-static properties while retaining the above properties. In addition, it is also an object thereof to provide a polarization film employing the above anti-reflection material, and in particular, performance of full color liquid crystal display is thereby drastically improved.

The inventors have conducted various research with regard to anti-static properties on the frontmost surface of anti-reflection material in order to prevent electrostatic charge from occurring on the surface of a display, etc., and consequently, they have found that the anti-static property can be obtained while retaining superior optical properties and physical properties before treating, by carrying out a surface hydrophilizing treatment such as a corona treatment, etc., on the frontmost surface of a conventional anti-reflection material having superior optical properties and physical properties.

Therefore, an anti-reflection material according to the present invention is characterized in that an anti-glare layer is provide on the surface of a transparent base substrate directly or via another layer, a low reflection layer having a lower reflective index than that of the anti-glare layer is provided on the surface of the anti-glare layer, and the frontmost surface of the anti-reflection material is subjected to a surface hydrophilizing treatment. In the following, preferable embodiments of the present invention will be explained in detail.

(1) Anti-reflection Material

A. Transparent Substrate

As a transparent substrate employed in an anti-reflection material according to the present invention, a conventional transparent film, glass, etc., can be employed. Specifically, various resin films such as polyethylene terephthalate (PET), triacetyl cellulose (TAC), polyacrylate, polyimide, polyether, polycarbonate, polysulfone, polyether sulfone, cellophane, aromatic polyamide, polyethylene, polypropylene, polyvinyl alcohol, and the like, and glass based materials such as fused glass, soda glass, and the like can be preferably employed. For PDPs and LCDs, PET and TAC are preferred.

The higher the transparency of the transparent substrate, the better the transparent substrate. The light transmittance (Japanese Industrial Standard C-6714) is preferably 80% or more, and is more preferably 90% or more. In the case in which the transparent substrate is employed in a compact and light-weighting liquid-crystal display, the transparent substrate is preferably in the form of a film. It is desirable that the transparent substrate be thin from the standpoint of being light-weight, and it is preferred that the thickness of the transparent substrate be preferably 1 to 5 μm in consideration of the productivity thereof.

In addition, the adhesion between the anti-glare layer and the transparent substrate can be improved by surface-treatment of the transparent substrate such as an alkaline treatment, corona treatment, plasma treatment, fluorine treatment, sputtering treatment, or the like, a coating, on the transparent substrate, of a surface active agent, a silane coupling agent, or the like, or a surface-modification-treatment such as an Si deposition or the like.

B. Anti-glare Layer

Next, an anti-glare layer in the present invention is explained.

As a resin for forming the anti-glare layer, a resin cured by means of radiation or heat, or a combination thereof, can be employed. As a radiation curable resin, compounds appropriately mixed with monomers, oligomers, or prepolymers having polymeric unsaturated bonds such as for an acryloyl group, methacryloyl group, acryloyloxy group, methacryloyloxy group, etc., can be employed. As a monomer, styrene, methyl acrylate, methyl methacrylate, methoxy polyethylene methacrylate, cyclohexyl methacrylate, phenoxy ethyl methacrylate, ethylene glycol dimethacrylate, dipentaerythritol hexaacrylate, trimethylolpropane trimethacrylate, and the like, can be mentioned. As an oligomer or prepolymer, an acrylate such as polyester acrylate, polyurethane acrylate, epoxy acrylate, polyether acrylate, alkyd acrylate, melamine acrylate, silicone acrylate, or the like, an unsaturated polyester, an epoxy-type compound, or the like, can be mentioned. These can be employed alone or in combination. In the case in which flexibility of the curing film is required, the amount of monomer employed is reduced. Furthermore, in order to reduce cross-linking density, it is preferable that an acrylic monomer having mono-functional or bi-functional acrylate be employed. Whereas in the case in which hard durability such as thermal resistance, wear resistance, solvent resistance, or the like, of the curing film is required, it is preferable that the amount of monomer be increased or that an acrylic monomer having tri-functional or greater acrylate be employed.

In order to cure the radiation curable resin as described above, for example, it is necessary that radiation such as UV, electron beam, X-ray, or the like, be irradiated on the resin, and a polymerization initiator can be appropriately added to the resin, as necessary. In the case of curing by means of irradiating with UV, a photopolymerization initiator must be added. As a photopolymerization initiator, an acetophenone such as diethoxy acetophenone, 2-hydroxy-2-methyl-1-phenylpropan-1-one, benzyl dimethyl ketal, 1-hydroxycyclohexyl-phenylketone, 2-methyl-2-monophorino (4-thiomethylphenyl) propan-1-one, or the like; a benzoin ether such as benzoin methylether, benzoin ethylether, benzoin isopropylether, benzoin isobutylether, or the like; a benzophenone such as benzophenone, o-benzoyl methyl benzoate, 4-phenyl benzophenone, 4-benzoyl-4'-methyl-diphenylsulfide, 4-benzoyl-N,N-dimethyl-N-[2-(1-oxo-2-propenyloxy) ethyl] benzene methanaminuim bromide, (4-benzoylbenzyl) trimethyl ammonium chloride, or the like; a thioxanthone such as 2,4-diethyl thioxanthone, 1-chloro-4-dichloro thioxanthone, or the like; 2,4,6-trimethylbenzoyl diphenylbenzoyl oxide, or the like; can be mentioned. These can be employed alone or in combination. In addition, as an accelerator (sensitizer), an amine-type compound such as N,N-dimethyl paratoluidine, 4,4'-diethylamino benzophenone, or the like, can be employed in combination. The content of the photopolymerization initiator is preferably in an amount of 0.1 to 10.0% by weight to the radiation curable resin. If the content is not in this range, UV-curing is insufficient.

In the present invention, it is preferable that an epoxy-type compound cured by UV-ray be employed as a radiation curable resin and that at least a cationic polymerization initiator be contained as a photopolymerization initiator for the following reasons.
① There is a little oxygen inhibition.
② There is little curing-shrinkage.
③ Adhesion to a transparent substrate is superior. By using a combination of the above epoxy resin and cationic polymerization initiator, good adhesion is exhibited even to a TAC film which usually has little adhesion and the excellent adhesion is exhibited to a saponified TAC film. Furthermore, an effect, in which decreasing of anti-glare property due to saponification is improved by the superior adhesion, is achieved.

As an example of epoxy-type compounds, a glycidyl ether such as tetramethylene glycol diglycidyl ether, propylene glycol diglycidyl ether, neopentyl glycol diglycidyl ether, bisphenol A diglycidyl ether, or the like, an epoxy ester such as 2-hydroxy-3-phenoxypropyl acrylate, an adduct of bisphenol A-diepoxy-acrylic acid, or the like, as well as a monomer and an oligomer such as an alicyclic epoxy represented by the following formulas, can be mentioned.

As a photo-cationic polymerization initiator, compounds represented by the following formulas can be employed. In the following formulas, $R_1$ and $R_2$ represent an alkyl group having one to six carbon atoms. Benzene rings in the following formulas may have any substituent. As a substituent, an alkyl group having one to six carbon atoms, hydrogen, etc, can be mentioned. These can be employed alone or in combination.

The photo-cationic polymerization initiators are preferably employed in an amount of 0.1 to 5.0% by weight, based on the primary agent. At less than 0.1% by weight or more than 5.0% by weight of the photo-cationic polymerization initiators, UV-curing is insufficient.

In the present invention, as described above, it is preferred that an epoxy type compound which is curable by ultraviolet light be employed as a radiation curable resin and that a photo-cationic-polymerization initiator be employed as a polymerization initiator. In this case, it is preferable that an acrylic compound which is curable by ultraviolet be mixed therein in order to control properties of a coating and a coating film such as viscosity, crosslinking density, thermal resistance, chemical resistance, and the like. As an example of such acrylic compounds, an acrylic acid derivative such as a mono-functional acrylate such as lauryl acrylate, ethoxydiethylene glycol acrylate, methoxytriethylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxy acrylate, or the like; a multi-functional acrylate such as neopentyl glycol diacrylate, 1,6-hexanediol diacrylate, trimethylolpropane triacrylate, pentaerythritol triacrylate, pentaerythritol tetraacrylate, dipentaerythritol hexaacrylate, trimethylolpropane acrylic benzoate, trimethylpropane benzoate, or the like; a methacrylic acid derivative such as a mono-functional methacrylate such as 2-ethylhexyl methacrylate, n-stearyl methacrylate, cyclohexyl methacrylate, tetrahydrofurfuryl methacrylate, 2-hydroxyethyl methacrylate, 2-hydroxybutyl methacrylate, or the like; a multi-functional methacrylate such as 1,6-hexanediol dimethacrylate, trimethylolpropane trimethacrylate, glycerin dimethacrylate, or the like; a monomer and an oligomer such as a urethane acrylate such as glycerin dimethacrylate hexamethylene diisocyanate, pentaerythritol triacrylate hexamethylene diisocyanate, or the like; can be mentioned.

The volumetric shrinkage ratio associated with curing of the anti-glare layer employing the above radiation curable resin (calculated by the following method) is preferably 20% or less. With a volumetric shrinkage ratio of 20% or more, in the case of a film-shaped transparent substrate, the film will curl severely, and in the case of a rigid substrate such as a glass or the like, the adhesion between the substrate and the anti-glare layer will be reduced.

Volumetric shrinkage ratio:

$$D=(S-S')/S\times 100$$

wherein
S: specific gravity before curing
S': specific gravity after curing
(Specific gravity is measured by the B method picnometer method of Japanese Industrial Standard K-7112.)

In the anti-glare layer according to the present invention, a stabilizer (a thermal polymerization inhibitor) for the radiation curable resin such as hydroquinone, p-benzoquinone, t-butylhydroquinone, etc., may be added. It is preferred that the stabilizer be employed in a range of 0.1 to 5.0% by weight to the radiation curable resin.

As a thermosetting resin which can be used in the anti-glare layer, phenol resin, furan resin, xylene-formaldehyde resin, ketone-formaldehyde resin, urea resin, melamine resin, aniline resin, alkyd resin, unsaturated polyester resin, epoxy resin, etc., can be employed. These may be employed alone or in combination. In the case in which a transparent substrate consists of plastics, the heat curing temperature cannot be set at a high temperature. In particular, in the case in which PET or TAC is employed, a thermosetting resin which can be cured at 100° C. or less is desirably employed.

It is preferable that the curable resin employed in the anti-glare layer have a higher transparency. The light permeability (Japanese Industrial Standard C-6714) is preferably 80% or more and more preferably 90% or more, in the case of the transparent substrate. The transparency of the anti-reflection material is affected by the refractive index of the curable resin. The refractive index of the above curable resin is preferably in a range of 1.45 to 1.70, and more preferably in a range of 1.5 to 1.65. With the refractive index outside of the range described above, anti-reflection effects are degraded.

By virtue of containing a filler in the anti-glare layer so as to roughen the surface of the anti-glare layer, the anti-reflection effects can be improved. As the filler, there can be mentioned an inorganic white pigment such as silica, calcium carbonate, aluminum hydroxide, magnesium hydroxide, clay, talc, titanium dioxide, or the like, or an organic transparent or white pigment such as an acrylic resin, polystyrene resin, polyethylene resin, epoxy resin, silicone resin, or the like. In particular, an organic filler which is spheroidal and does not exhibit oil absorbing ability is preferable. By means of employing spheroidal fillers, the projecting parts projecting from the surface of the anti-glare layer are moderated, and contaminants such as oil do not adhere well, and in addition, it is easy to wipe off adhering contaminants.

Such a filler preferably has a particle size D (Japanese Industrial Standard B9921) wherein the particles having a particle size D in a range of 0.5 $\mu$m$\leq$D$\leq$6.0 $\mu$m are present in an amount of 60% or more by weight, particles having a particle size D in a range of 6.0 $\mu$m<D<10.0 $\mu$m are present in an amount of less than 20% by weight, particles having a particle size D in a range of 10.0 $\mu$m<D$\leq$15.0 $\mu$m are present in an amount of less than 5% by weight, and particles having a particle size D of more than 15.0 $\mu$m are present in an amount of 1.0% or less by weight. In addition, it is preferred that the particles having a particle size D of more than 15 $\mu$m are not present (0%), insofar as is possible. In particular, it is preferred that the particles having a particle size D in a range of 0.5 $\mu$m$\leq$D$\leq$6.0 $\mu$m are present in an amount of 80% or more by weight, particles having a particle size D in a range of 6.0 $\mu$m<D$\leq$10.0 $\mu$m are present in an amount of less than 10% by weight, and particles having a particle size D in a range of 10.0 $\mu$m<D$\leq$15.0 $\mu$m are not present at all. In the case in which a filler has a particle size D wherein the particles having a particle size D in a range of 0.5 $\mu$m$\leq$D$\leq$6.0 $\mu$m, particles having a particle size D in a range of 6.0 $\mu$m<D$\leq$10.0 $\mu$m, and particles having a particle size D in a range of 10.0 $\mu$m<D$\leq$15.0 $\mu$m are present in an amount of less than 60% by weight, less than 20% by weight, and less than 5% by weight, respectively, anti-reflection effects of displays are degraded. On the other hand, in the case in which a filler has a particle size D wherein the particles having a particle size D in a range of 6.0 $\mu$m<D$\leq$10.0 $\mu$m are present in an amount of 20% or more by weight, or the particles having a particle size D in a range of 10.0 $\mu$m<D$\leq$15.0 $\mu$m are present in an amount of 5% by weight, the image on the displays glitters. The filler is preferably present in an amount of 0.5% to 30% in the total solid ratio of the anti-glare layer. In particular, it is more preferably present in a range of 1% to 15%. With 0.5% or less of the filler, sufficient anti-reflection effects cannot be obtained. On the other hand, with 30% or more of the filler, not only are the transparency and the contrast of the image degraded, but also durability such as wear resistance, environmental resistance, and the like is impaired. In addition, the refractive index of the filler (B method according to Japanese Industrial Standard K-7142) is preferably equivalent to that of the curable resin. In the case where the refractive index of the filler is different from that of the curable resin, light is scattered at the interface of the resin and the filler, and therefore the transparency is impaired. As an example of fillers having a refractive index equivalent to that of the curable resin, there can be mentioned organic fillers, and in particular crosslinking acryl beads.

As the crosslinking acryl beads, those consisting of polymers and copolymers obtained by means of polymerization such as suspension polymerization using an acrylic monomer such as acrylic acid and an ester thereof, methacrylic acid and an ester thereof, acrylic amide, acrylonitrile, or the like, a polymerization initiator such as persulfuric acid, or the like, and a crosslinking agent such as ethylene glycol dimethacrylate, or the like, is preferably employed. In particular, as an acrylic monomer, a monomer using methyl methacrylate is preferred. The crosslinking acrylic beads thus obtained are spheroidal and do not exhibit oil absorbing ability. For this reason, in the case where the beads are employed in the anti-glare layer, excellent stain resistance can be exhibited.

In addition, the crosslinking acrylic beads may be surface-treated by fats and oils, a silane-coupling agent, an organic or inorganic material such as a metal oxide, or the like in order to improve dispensability of the coating material.

In the present invention, as a method for forming an anti-glare layer, directly or via another layer, on one surface of the transparent substrate, there can be mentioned a method consisting of the steps of: mixing a filler such as crosslinking acrylic beads or the like, water, or an organic solvent in the UV-curable resin described above, as necessary; dispersing the mixture using a paint shaker, sand mill, peal mill, ball mill, attritor, roll mill, high-speed impeller disperser, jet mill, high-speed impact mill, ultrasonic disperser, or the like, to form a coating material or an ink; providing a mono-layer or multi-layers on one surface of the transparent substrate by means of a printing method such as a letterpress printing such as flexographic printing or the like, an intaglio printing such as direct gravure printing, offset gravure printing, or the like, a planographic printing such as offset printing or the like, a stencil printing such as screen process printing or the like, or a coating such as air doctor coating, blade coating, knife coating, reverse coating, transfer roll coating, gravure roll coating, kiss coating, cast coating, spray coating, slot orifice coating, calender coating, electrodeposition coating, dip coating, die coating or the like; thermal-drying the coating or printing layers in the case where a solvent is included; and curing the coating or printing layers by means of radiation (in the case of UV radiation, a photo-polymerization initiator is necessary). In the case where the radiation is an electron beam, an electron beam having an energy of 50 KeV to 1000 KeV emitted from various electron beam accelerators such as a Cockroft-Walton apparatus, bandegraph apparatus, resonance transformer apparatus, insulating core transformer apparatus, linear type apparatus, dynamitron type apparatus, high-frequency type apparatus, or the like is employed. In the case where the radiation is UV radiation, the UV radiation emitted from the light of an extra-high pressure mercury vapor lamp, high pressure mercury vapor lamp, low pressure mercury vapor lamp, carbon arc lamp, xenon arc lamp, metal halide lamp, or the like can be employed.

In order to improve the coating aptitude or printing aptitude of a coating material and an ink, a levelling agent such as silicone oil or the like, fats and oils such as polyethylene wax, carnauba wax, higher alcohols, bisamide, higher fatty acids, or the like, a curing agent such as isocyanate or the like, an additive such as ultra-microparticles having a particle size of 0.1 $\mu$m or less, such as calcium carbonate, silica sol, synthetic mica, or the like, can be employed, as necessary.

The thickness of the anti-glare layer is preferably in a range of 0.5 $\mu$m to 10 $\mu$m, and more preferably in a range of 1 $\mu$m to 5 $\mu$m. In the case where the thickness of the anti-glare layer is less than 0.5 $\mu$m, wear resistance of the anti-glare layer is degraded, or in the case of a UV-curable resin being employed in the anti-glare layer, the resin fails to cure due to oxidation inhibition. On the other hand, in the case where the thickness of the anti-glare layer is more than 10 $\mu$m, curling occurs due to curing-shrinkage of the resin, microcracking occurs in the anti-glare layer, or the adhesion between the transparent substrate and the anti-glare layer is decreased.

C. Low Reflection Layer

In addition, in order to improve anti-reflection effects, the refractive index of the low reflection layer is preferably lower than that of the anti-glare layer, and is preferably 1.45 or less. As a material having such characteristics, there can be mentioned, for example, an inorganic low-reflection material wherein an inorganic material such as LiF (refractive index: n=1.4), $MgF_2$ (n=1.4), $3NaF.AlF_3$ (n=1.4), $AlF_3$ (n=1.4), $Na_3AlF_6$ (n=1.33), or the like is microgranulated, and the microgranules are contained in an acrylic resin or an epoxy resin, or an organic low-reflection material such as a fluorine-containing compound, a silicone type organic compound, a thermoplastic resin, a thermosetting resin, a radiation curable resin, or the like. Among these, a fluorine-containing compound is particularly preferred in view of stain-preventing effects. Furthermore, it is preferable that the critical surface tension of the low reflection layer be 20 dyne/cm or less. In the case where the critical surface tension is more than 20 dyne/cm, it is difficult for stains adhered on the surface layer to be wiped off.

As the fluorine-containing compound described above, there can be mentioned a fluorinated vinylidene type copolymer which can be dissolved in an organic solvent and is easy to apply, a fluoro-olefin/hydrocarbon copolymer, a fluorine-containing epoxy resin, a fluorine-containing epoxy acrylate, a fluorine-containing silicone, a fluorine-containing alkoxysilane, as well as TEFLON AF 1600 (produced by Dupont Inc., n=1.30), CYTOP (produced by Asahi Glass Corporation, n=1.34), 17 FM (produced by Mitsubishi Rayon Corporation, refractive index n=1.35), Opster JN-7212 (produced by Nihon Gosei Gum Corporation, n=1.40), LR 201 (produced by Nissan Chemical Industry Corporation, n=1.38), or the like. These may be employed alone or in combination.

In addition, a radiation-curable-type fluorine-containing monomer, oligomer, prepolymer, or the like such as a fluorine-containing methacrylate such as 2-(perfluorodecyl)ethyl methacrylate, 2-(perfluoro-7-methyloctyl)ethyl methacrylate, 3-(perfluoro-7-methyloctyl)-2-hydroxypropyl methacrylate, 2-(perfluoro-9-methyldecyl)ethyl methacrylate, 3-(perfluoro-8-methyldecyl)-2-hydroxypropyl methacrylate, or the like, a fluorine-containing acrylate such as 3-perfluorooctyl-2-hydroxypropyl acrylate, 2-(perfluorodecyl)ethyl acrylate, 2-(perfluoro-9-methyldecyl)ethyl acrylate, or the like, an epoxide such as 3-perfluorodecyl-1,2-epoxy propane, 3-(perfluoro-9-methyldecyl)-1,2-epoxy propane, or the like, an epoxy acrylate, or the like can be employed. These can be employed alone or in combination.

In addition, a low-reflection material obtained by mixing a fluorine-type film-forming agent and a sol wherein silica microparticles having a particle size of 5 to 30 nm are dispersed in water or an organic solvent can be employed. As the sol wherein silica microparticles having a particle size of 5 to 30 nm are dispersed in water or an organic solvent, a well-known silica sol obtained by means of condensation of an activated silicic acid known by a method for de-alkalization using an ion exchange of an alkali metal ion in an alkaline salt of silicic acid, or a method for neutralization of an alkaline salt of silicic acid with a mineral acid; a well-known silica sol obtained by means of hydrolysis and condensation of an alkoxysilane in an organic solvent in the presence of a basic catalyst; or an organic-solvent type silica sol (organosilica sol) obtained by replacing the water in an aqueous silica sol described above with an organic solvent by a distillation method may be employed. These silica sols can be employed in either an aqueous or organic-solvent condition. The organic-solvent type silica sol contains a solid component as $SiO_2$ in a concentration of 0.5 to 50% by weight. Various types of silica ultra-microparticles in the silica sol such as in a spheroidal form, a needle form, a plate form, or the like can be employed.

In addition, as a film forming agent, an alkoxysilane, a metal alkoxide, a hydrolysate of metal salt, fluorine-modified polysiloxane, or the like can be employed. Of the film forming agents described above, in particular, a fluorine compound is preferably employed in order to decrease the critical surface tension of the low reflection layer and prevent oil from adhering. The low reflection layer according to the present invention can be obtained, for example, by diluting the materials described above with a solvent, providing the materials on the anti-glare layer by means of a spin coater, a roll coater, a printer, or the like, drying the materials, and curing them by means of heat or radiation (in the case of UV radiation, a photo-polymerization initiator is necessary). Although the radiation curable-type of fluorine-containing monomer, oligomer, and prepolymer are superior in stain resistance, they may have disadvantages in that the low reflection layer is repelled by the anti-glare layer in the case of some composition ratios, or the low reflection layer peels off from the anti-glare layer, caused by inferior wetting properties. For these reasons, it is preferred that the monomer, oligomer, and prepolymer of an acryloyl type or a methacryloyl type, or those including a polymerizable unsaturated bond such as an acryloyloxy group, methacryloyloxy group, or the like, described in the radiation curable resin employed in the anti-glare layer be mixed in an appropriate ratio and be employed.

In the case where, in the transparent substrate, a plastic film such as PET, TAC, or the like liable to be damaged by heat is employed, a radiation curable resin is preferably selected as a material for the low reflection layer.

In order to improve the coating aptitude or printing aptitude of a coating material and an ink in the low reflection layer, a levelling agent such as silicone oil or the like, fats and oils such as polyethylene wax, carnauba wax, higher alcohols, bisamide, higher fatty acids, or the like, a curing agent such as isocyanate or the like, an additive such as ultra-microparticles having a particle size of 0.05 $\mu$m or less, such as calcium carbonate, silica sol, synthetic mica, or the like, can be employed, as necessary, in the same manner as for the anti-glare layer.

The thickness of the low reflection layer for exhibiting superior anti-reflection properties can be calculated according to a well-known expression. According to a well-known document (Science Library, Physics 9 "Optics", pp. 70 to 72), when incident light is incidented vertically on the low reflection layer, it is considered that the condition for which the low reflection layer does not reflect the light and the light is transmitted at 100% may be satisfied in the following relational expression. In the expression, $N_0$ is the refractive index of the low reflection layer, $N_S$ is the refractive index of the anti-glare layer, h is the thickness of the low reflection layer, and $\lambda_0$ is the wavelength of the light.

$$N_0 = N_S^{1/2} \qquad \text{Expression (1)}$$

$$N_0 h = \lambda_0/4 \qquad \text{Expression (2)}$$

According to Expression (1), it can be seen that in order to prevent the light reflection completely (100%), a material wherein the refractive index of the low reflection layer corresponds to the square root of the refractive index of the lower layer (anti-glare layer) may be selected. In practice, it is difficult to find a material that satisfies the expression completely, and therefore a material which has properties very near to those of a material that satisfies the expression completely is used. In expression (2), the optimum thickness as an anti-reflection film of the low reflection layer can be calculated from the refractive index of the low reflection layer selected according to expression (1) and the wavelength of the light. For example, in the case where the refractive index of the anti-glare layer and that of the low reflection layer are 1.50 and 1.38, respectively, and the wavelength of the light is 550 nm, an optical film thickness of the low reflection layer is calculated as approximately 0.1 µm, and preferably in a range of 0.1±0.01 µm, according to expression (2).

The HAZE value according to Japanese Industrial Standard K-7105 of the thus-obtained anti-reflection material according to the present invention is preferably in a range of 3 to 30, and more preferably in a range of 5 to 15. With a HAZE value of less than 3, the light scattering effects are small, and therefore sufficient anti-reflection effects cannot be obtained. On the other hand, with a HAZE value of more than 30, the image contrast is degraded and visibility is degraded, and for these reasons, it is not preferred since inferiority as a display is caused. The HAZE value is a clouding value, and it is calculated according to the following expression by measuring a luminous diffuse transmittance (Hd %) and a total light transmittance (Ht %) using an integrating sphere type light transmittance measuring apparatus.

$$\text{HAZE value} = Hd/Ht \times 100$$

(2) Surface Hydrophilizing Treatment of Low Reflection Layer

An anti-reflection material of the present invention is characterized in that surface hydrophilizing treatment is carried out on the frontmost surface of the anti-reflection material, in order to prevent contaminants such as dust, etc., from adhering by static electricity occurring at the surface of display. According to the present invention, it is not necessary that an anti-static layer containing anti-static material or electroconductive filler be provided and in addition, anti-static properties can be easily obtained even for conventional anti-reflection material having excellent optical properties and physical properties. Therefore, the present invention can provide an anti-reflection material which is superior in productivity and is economical.

As this surface hydrophilizing treatment, corona treatment, plasma treatment, saponification treatment, etc., can be employed. Of these, corona treatment or plasma treatment is preferable, since anti-reflection material is limited to materials having substantial alkali resistance in the case in which saponification treatment is carried out. It is preferable that the surface hydrophilizing treatment be carried out so that the static attenuation half-value period of the frontmost surface is 500 seconds or less, in particular, 300 seconds or less, in order to demonstrate good anti-static properties. In addition, on the frontmost surface subjected to the surface hydrophilizing treatment, the contact angle with water is preferably 85 degrees or less, more preferably 75 to 10 degrees, and most preferably 65 to 20 degrees. When the contact angle with water is above 85 degrees, there is a fear that the anti-static property will be insufficiently obtained. In contrast, when the contact angle is below 10 degrees, fingerprints easily adhere and are hard to wipe off, and therefore fingerprint resistance is deteriorated and there is a fear that problems of dirtying of the surface of the display will occur. It is preferable that the corona discharge amount be 40 to 200 W·min/m², when corona treatment is carried out as a surface hydrophilizing treatment. In this case, when the corona discharge amount is below 40 W·min/m², anti-static property is insufficiently obtained. In contrast, when the corona discharge amount is above 200 W·min/m², as well as the above case in which the contact angle is too small, there are problems in that the surface of the anti-reflection film is easily dirtied or is broken during the treatment.

(3) Polarization Film

A. Polarization Film-1

A polarization film can be obtained by providing an anti-reflection material having the composition described above on one surface of the polarization substrate. The polarization substrate consists of a material which can form a transparent film, and as the material, for example, polyvinyl alcohol, polyvinylene, or the like can be employed. Such a material is drawn to form a film, thus yielding a polarization substrate. For example, it is preferred that a polyvinyl alcohol (PVA) film obtained by uniaxially drawing a polyvinyl alcohol to which iodine or a dye is adsorbed as dichroism elements is employed. A polarization substrate having a thickness of 10 to 80 µm may be employed.

B. Polarization Film-2

Another polarization film according to the present invention comprises a first protective material having anti-reflection property (corresponding to the above anti-reflection material shown in (1)), in which an anti-glare layer and a low reflection layer are provided on a transparent substrate, in that order, are provided on one surface of the above film-shaped polarization substrate and a second protective material is provided on the other surface of the polarization substrate. It is desirable that a first protective material and a second protective material be laminated on both surfaces of a polarization substrate by polyester-type adhesive, polyacrylic-type adhesive, polyurethane-type adhesive, polyvinyl acetate-type adhesive, etc. Specifically, the polarization substrate is obtained by drawing a PVA film in a uniaxial direction approximately three or four times and then immersing the drawn PVA film into a high-order iodine ion.

Since the PVA film obtained above has disadvantages in that it is liable to be torn and the shrinking ratio is large with regard to humidity change, due to an impaired strength, on the double surfaces of the polarization substrate, protective materials are laminated thereon. As the transparent substrate employed as the first protective material and the second protective material, a film of a transparent polymer compound such as a cellulose type film such as triacetyl cellulose, a polyester film, a polycarbonate film, or the like is employed. Among these, triacetyl cellulose is in particular preferred. The film thickness is preferably in a range of 10 to 2000 µm. In addition, it is preferred to improve the water resistance of the film by means of employing a gelling agent such as boric acid or the like, by means of a heat treatment, or by means of a formalization. In addition, in order to improve the adhesion between the polarization substrate and the film, it is preferred that a surface treatment such as a saponification treatment, a corona treatment, or the like be carried out so that the surface energy of the adhesion face with the polarization substrate is 50 dyne/cm or more.

DETAILED DESCRIPTION OF THE PREFERRED EMBODIMENTS

An anti-reflection material and a polarization film according to the present invention will be explained in detail with reference to the accompanying drawings.

Figure 1:
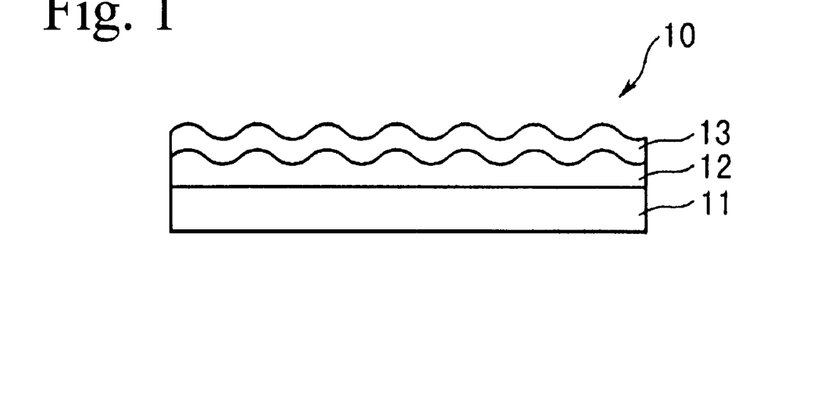
FIG. 1 is a schematic cross-sectional drawing showing a structure of an anti-reflection material according to the present invention.

FIG. 1 shows a schematic cross section of an anti-reflection material according to the present invention. The anti-reflection material 10 consists of a transparent substrate 11, an anti-glare layer 12 formed on a surface thereof, and a low reflection layer 13 formed on the surface of the anti-glare layer 12.

Figure 2:
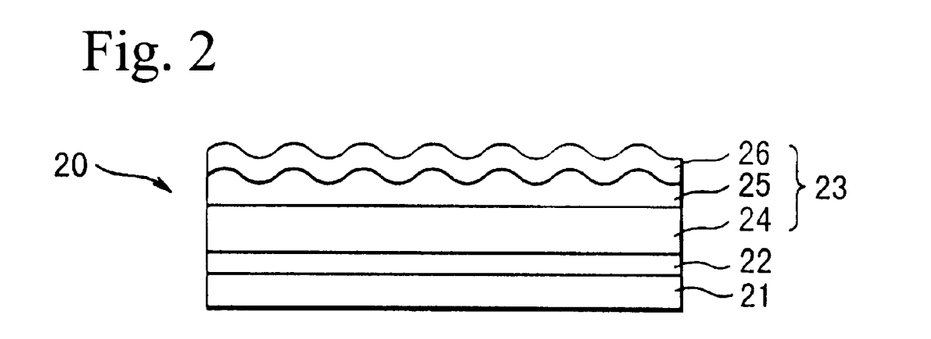
FIG. 2 is a schematic cross-sectional drawing showing a structure of a polarization film employing an anti-reflection material according to the present invention.

FIG. 2 shows a schematic cross section of a polarization film according to the present invention. In the polarization film 20, a first protective material 23, that is, an anti-reflection film consisting of an anti-glare layer 25 and a low reflection layer 26 laminated on a transparent substrate 24 is formed on one surface of a polarization substrate 22, and a second protective material 21 is formed on the other surface of the polarization substrate 22.

FIG. 3 shows a liquid crystal display 30 having improved anti-glare properties due to an anti-reflection material according to the present invention. In the liquid crystal display 30, a back light 40 is situated at the rear (the lower side in FIG. 3) thereof; a liquid crystal cell 32 and a polarization film 33 having a low reflection layer are laminated on the front (the upper side in FIG. 3) of a TFT glass substrate 31, in that order; and a polarization film 34 without a low reflection layer is laminated on the rear of the TFT glass substrate 31.

In the liquid crystal cell 32, for example, a twisted nematic (TN) liquid crystal cell can be used. In the TN liquid crystal cell, alignment layers are formed by coating a polyimide resin on transparent electrodes of a pair of glass substrates having a desired pattern. The alignment layers are aligned by a rubbing treatment. Then, a nematic liquid crystal is filled between the glass substrates and is sealed therein by adhering the periphery of the glass substrate with an epoxy resin. The nematic liquid crystal is aligned with a twist angle of 90 degrees by virtue of the alignment layer.

The polarization films 33 and 34 have a basic construction in which a transparent substrate 36 and a protective material 37 are laminated on the front and the rear of a polarization material 35, respectively. In the polarization film 33 having a low reflection layer, an anti-glare layer 38 and a low reflection layer 39 are laminated, in that order. The polarization films 33 and 34 clamp a TFT glass substrate 31 and a liquid crystal cell 32 and are disposed so as to twist the polarization angles thereof by 90 degrees.

When a driving signal is applied to transparent electrodes of the TN liquid crystal panel 30, an electric field is produced between the electrodes. Then, the long axes of the molecules of the liquid crystals become parallel to the direction of the electric field by virtue of electric anisotropy of the molecules of the liquid crystal. As a result, the light is not transmitted through the liquid crystal panel. The contrast due to difference in light transmittance is recognized as visual information. In the liquid crystal display, the light is irradiated from the back light 40, and images can therefore be formed by the contrast between the portions where light is transmitted and is not transmitted.

EXAMPLES

The characteristics according to the present invention will be explained with Examples. In the following, "parts" refer to "parts by weight".

Example 1

First, a dispersion liquid, described below, obtained by dispersing a mixture of cross-linking acrylic beads and toluene using a sand mill for 30 minutes, and a base coating material, described below, were stirred for 15 minutes with a disper. The mixed coating material was coated on one surface of triacetyl cellulose (trade name: Fuji Tack UVD 80, produced by Fuji Film Corporation; refractive index 1.49) which is a transparent substrate having a film thickness of 80 μm and a transmittance of 92%, by means of a reverse coating method, and was subsequently dried for 2 minutes at 100° C. Subsequently, the film was irradiated with UV radiation to cure the coating film, under the conditions of radiation distance (distance between the center of the lamp and the coating face): 10 cm, treatment speed (speed with respect to the mercury lamp at the coating substrate): 5 m/min, using one converging type high-pressure mercury lamp (power: 120 W/cm). In this manner, an anti-glare layer having a thickness of 1.7 μm and a refractive index of 1.53 was formed. Subsequently, a fluorine-containing silica sol (trade name: LR 201, produced by Nissan Chemical Industry Corporation, total solid concentration: 4%, solvent: ethanol/butylcersorb=50/50) was coated on the anti-glare layer by means of spin coating. The coating was dried for one minute at 100° C., and was heat-cured for 6 hours at 120° C., thus producing a low reflection layer having a thickness of 0.1 μm, a refractive index of 1.38, and a critical surface tension of 11 dyne/cm. As a result, an anti-reflection material according to the present invention having a HAZE value of 10.5 and a reflectance of 1.4% was obtained.

<Composition of the Dispersion Liquid>

Crosslinking acrylic beads (trade name: MX 150, produced by Soken Chemical Corporation; particle size 1.5±0.5 μm), 9 parts Toluene, 210 parts <Composition of the Base Coating Material>

Acrylic type compound

Dipentaerythritol triacrylate, 45 parts

Epoxy type compound (trade name: Celloxite 2021, produced by Dicel Chemical Industry), 45 parts Photo-cationic-polymerization initiator Compound represented by the following formula, 2 parts Isopropyl Alcohol, 5 parts Next, this anti-reflection film was subjected to a corona treatment at treatment power: 400W, treatment speed: 10 m/minute, using a corona discharge surface treatment device having internal pressure blast type of a one surface treatment frame (trade name: AGI-021 type, produced by Kasuga Elctric Works Ltd. (discharging electrode portion: 6 electrodes of 5-type of 10 t×900 mm; 12 protuberances in 1 electrode, treatment roll: 187φ×195φ×1050 mm)), and an antireflection film of Example 1 according to the present invention was therefore obtained.

Examples 2 to 4

Anti-reflection films of Examples 2 to 4 according to the present invention were obtained, in the same manner as that of Example 1 except that treatment power of the surface hydrophilizing treatment was changed to that described in the following Table 1.

TABLE 1

| | Treatment Power (W) | Corona Discharge Amount (W · min/m$^2$) |
|---|---|---|
| Example 1 | 400 | 44.4 |
| Example 2 | 800 | 88.9 |
| Example 3 | 1200 | 133.3 |
| Example 4 | 1600 | 177.8 |
| Comparative Example 1 | 0 | 0 |

Comparative Example 1

Anti-reflection films of Comparative Example 1 were obtained, in the same manner as that of Example 1, except that the surface hydrophilizing treatment was not carried out.

With regard to the anti-reflection films of Examples 1 to 4 and Comparative Example 1 as obtained above, after 12 hours had passed since the corona treatment, the contact angle of surface with water, surface electric resistance, static attenuation half-value period, anti-static properties, 5 degrees specular reflectance, and pencil hardness were measured by the following methods and were evaluated.

(1) Contact Angle with Water Water droplets were dropped on the frontmost surface of each anti-reflection film, and the contact angle was measured using a contact angle meter (trade name: Elmer G-I type contact angle meter, produced by Elmer Co., Ltd.).

(2) Surface Electric Resistance

Surface electric resistance of each anti-reflection film was measured using a high resistivity meter (trade name: Hiresta up, produced by Mitsubishi Chemistry Co., Ltd.).

(3) Static Attenuation Half-value Period

Static attenuation half-value period of each anti-reflection film was measured in accordance with Japanese Industrial Standard L-1094, using a static honest meter (produced by Shishido Static Electricity Co., Ltd.).

(4) Anti-static Property 1

The frontmost surface of each anti-reflection film was rubbed by a cloth made of polyester resin and was charged. After 5 minutes, a charged surface of the anti-reflection film was brought close to an ashtray which contained cigarette ashes, and the anti-static property was evaluated by observing the adhesion of the ashes. In this evaluation, the following criteria were used: cases where there was no adhesion of the ashes: ○; cases where there was adhesion of the ashes: ×.

(5) Anti-static Property 2

A printing paper was put on the surface of each anti-reflection film, and the surface of the film was rubbed 20 times by holding an edge of the printing paper and using the self-weight of the paper. Subsequently, the film was hung down vertical to the floor, and the anti-static property was evaluated by observing the falling of the paper. In this evaluation, the following criteria were used: cases where the paper fell (there was no frictional electrification): ○; cases where the paper did not fall (there was frictional electrification): ×.

(6) 5 Degrees Specular Reflectance 5 degrees specular reflection of each anti-reflection film was measured at wavelengths of 400 to 700 nm, using a spectrophotometer (trade name: UV 3100, produced by Shimadzu Co., Ltd.) and was luminosity-corrected in accordance with Japanese Industrial Standard Z-8701, and reflectivity was shown by a Y value. Here, after the non-measured surface of the film was perfectly painted by black magic ink, the measurement was carried out.

(7) Pencil Hardness

Pencil hardness was measured in accordance with Japanese Industrial Standard K-5400, using a pencil hardness tester (produced by Yoshimitsu Seiki Co., Ltd.).

The above evaluated results are shown in Table 2.

TABLE 2

| | Contact Angle of Surface with Water (degree) | Surface Electric Resistance (Ω/□) | Static Attenuation Half-Value Period (seconds) | Anti-static Property 1 | Anti-static Property 2 | 5 Degrees Specular Reflectance | Pencil Hardness |
|---|---|---|---|---|---|---|---|
| Example 1 | 37 | $5.0 \times 10^{13}$ | 300 | ○ | ○ | 1.16 | 2H |
| Example 2 | 27 | $4.0 \times 10^{13}$ | 250 | ○ | ○ | 1.19 | 2H |
| Example 3 | 24 | $9.0 \times 10^{12}$ | 200 | ○ | ○ | 1.15 | 2H |
| Example 4 | 23 | $2.0 \times 10^{12}$ | 150 | ○ | ○ | 1.12 | 2H |
| Comparative Example 1 | 110 | $\geq 10^{14}$ | 700 | × | × | 1.20 | 2H |

As is apparent from the results shown in Table 2, in Comparative Example 1 which is a conventional anti-reflection film, there was a problem in anti-static properties. In contrast, in the anti-reflection films of the present invention, excellent anti-static properties were demonstrated while superior 5 degrees specular reflectance and pencil hardness were retained.

As explained above, according to the present invention, by carrying out the surface hydrophilizing treatment on anti-reflection materials in which conventional excellent optical properties and physical properties are exhibited, anti-static properties can be improved while these excellent properties are retained, and therefore adhesion of dust, etc., can be prevented.

What is claimed is:

1. An anti-reflection material comprising
   a transparent substrate,
   an anti-glare layer provided on the surface of the transparent substrate directly or on another layer disposed on the surface of the transparent substrate, and
   a low reflection layer provided on the surface of the anti-glare layer,
   wherein the low reflection layer has a frontmost surface subjected to a surface hydrophilizing treatment and a lower refractive index than that of the anti-glare layer, and the frontmost surface of the low reflection layer has a static attenuation half-value period of 500 seconds or less.

2. An anti-reflection material in accordance with claim 1, wherein the surface hydrophilizing treatment is a corona treatment.

3. An anti-reflection material in accordance with claim 1, wherein the surface hydrophilizing treatment is a plasma treatment.

4. An anti-reflection material in accordance with claim 1, wherein the surface hydrophilizing treatment is a saponification treatment.

5. An anti-reflection material in accordance with claim 1, wherein the low reflection layer comprises a fluorine-containing compound.

6. An anti-reflection material in accordance with claim 2, wherein the low reflection layer comprises a fluorine-containing compound.

7. An anti-reflection material comprising a transparent substrate, an anti-glare layer provided on the surface of the transparent substrate directly or on another layer disposed on the surface of the transparent substrate, and a low reflection layer provided on the surface of the anti-glare layer, wherein the low reflection layer has a frontmost surface subjected to a surface hydrophilizing treatment and a lower refractive index than that of the anti-glare layer, and the frontmost surface of the low reflection layer has a contact angle with water of 85 degrees or less.

8. An anti-reflection material in accordance with claim 7, wherein the contact angle with water is 10 to 75 degrees.

9. An anti-reflection material in accordance with claim 7, wherein the frontmost surface of the low reflection layer has a static attenuation half-value period of 500 seconds or less.

10. An anti-reflection material in accordance with claim 7, wherein the low reflection layer comprises fluorine-containing compound.

11. A polarization film comprising a protective layer provided on the surface having no anti-glare layer and low reflection layer of the transparent substrate in the anti-reflection material in accordance with claim 1 via a polarization substrate.

12. A polarization film comprising a protective layer provided on the surface having no anti-glare layer and low reflection layer of the transparent substrate in the anti-reflection material in accordance with claim 7 via a polarization substrate.

* * * * *